Figure 1:
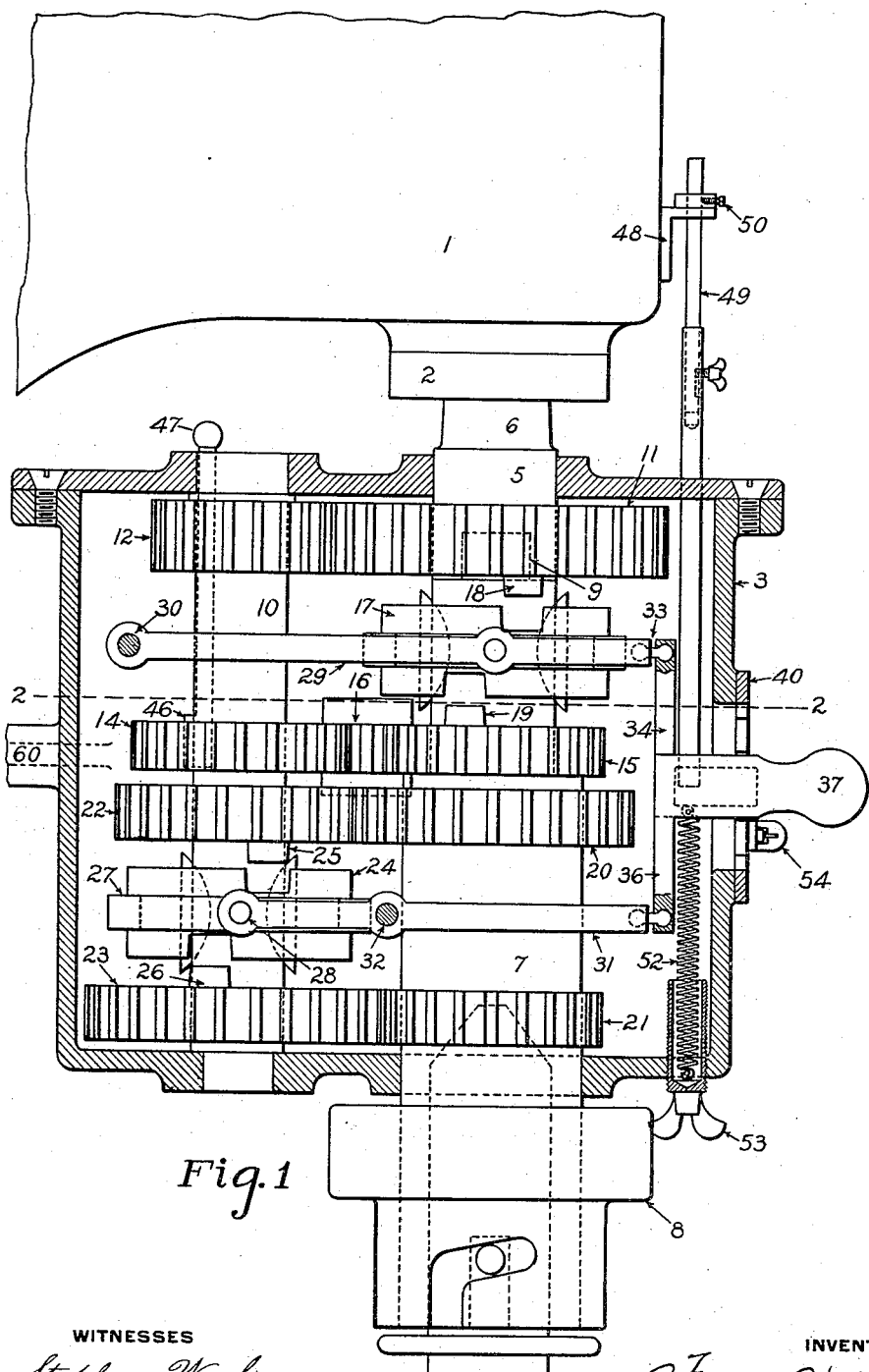

F. P. MILLER.
AUTOMATIC SPEED CHANGE AND TAP REVERSING ATTACHMENT FOR DRILL PRESSES.
APPLICATION FILED JUNE 20, 1910.

1,017,785.

Patented Feb. 20, 1912.

2 SHEETS—SHEET 1.

WITNESSES

INVENTOR

F. P. MILLER.
AUTOMATIC SPEED CHANGE AND TAP REVERSING ATTACHMENT FOR DRILL PRESSES.
APPLICATION FILED JUNE 20, 1910.
1,017,785.
Patented Feb. 20, 1912.
2 SHEETS—SHEET 2.
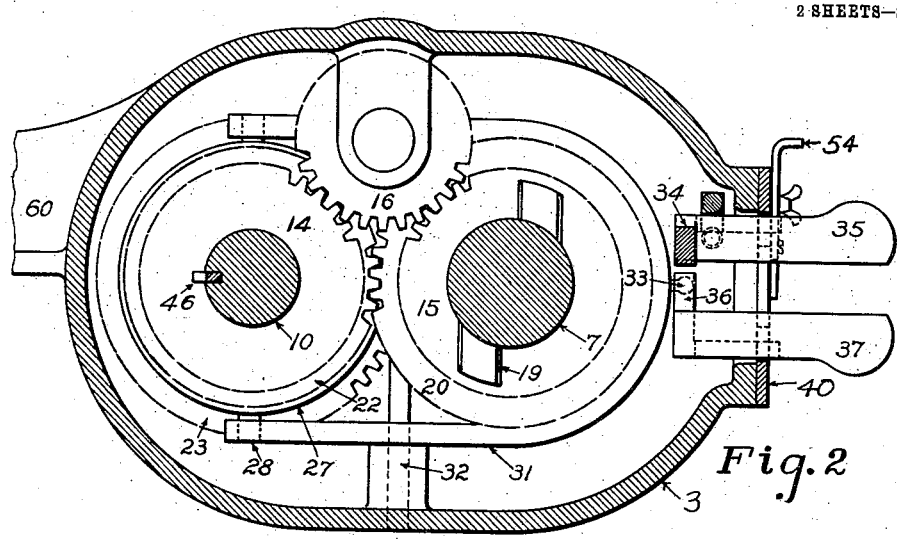
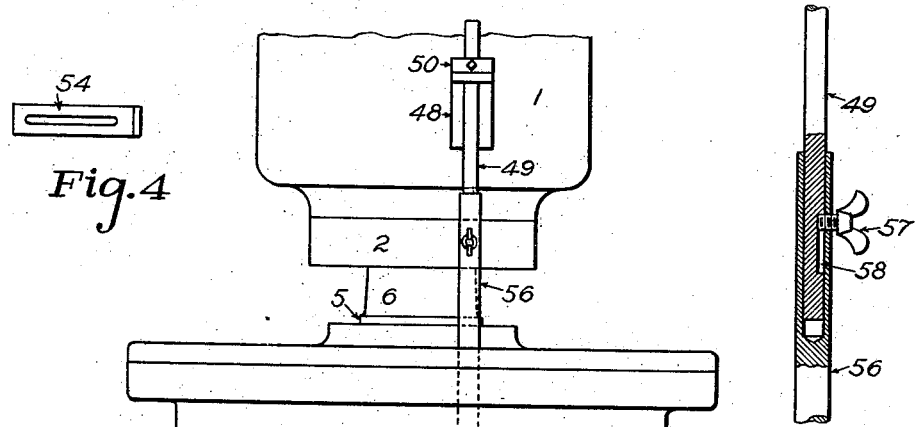
WITNESSES
INVENTOR

UNITED STATES PATENT OFFICE.

FRANK P. MILLER, OF MEADVILLE, PENNSYLVANIA.

AUTOMATIC SPEED-CHANGE AND TAP-REVERSING ATTACHMENT FOR DRILL-PRESSES.

1,017,785. Specification of Letters Patent. Patented Feb. 20, 1912.

Application filed June 20, 1910. Serial No. 567,876.

*To all whom it may concern:*

Be it known that I, FRANK P. MILLER, a resident of Meadville, in the county of Crawford and State of Pennsylvania, have invented a new and useful Improvement in Automatic Speed-Change and Tap-Reversing Attachments for Drill-Presses, of which the following is a specification.

This invention relates to reversing and speed changing attachments for drill presses to be used for drilling and tapping.

The purpose of the invention is to provide a device of this character which not only provides for automatically reversing the tap when it has reached the desired depth, but also provides for driving the tap or drill or tools of any kind, at different speeds.

The specific purpose is to provide a device of the character named which is reliable, convenient to operate, and which is not of excessive size.

The device comprises the arrangement and combination of parts hereinafter described and claimed.

In the accompanying drawings Figure 1 is a side elevation of the attachment with the frame in section; Fig. 2 is a cross section on the line 2—2, Fig. 1; Fig. 3 is a front elevation showing the means for locking the clutch levers; Fig. 4 is a detail view of the sliding stop; and Fig. 5 is a detail view of the trip rod joint for the automatic reversing mechanism.

In the drawings 1 represents a stationary part of the drill press in which is mounted the usual rotary spindle 2. These parts may represent any standard form of drill press.

The attachment comprises a suitable frame 3 in which there is mounted a two-part spindle, the same comprising two sections in alinement with each other, to wit, an upper section 5 provided with a tapered shank 6 or the like, for attachment to the press spindle 2, and a lower section 7 which carries a chuck 8 of any suitable type. The two sections of the spindle are held in alinement by means of a circular projection 9 on the one entering the socket in the end of the other. Also mounted in the frame 3 behind the two-part spindle is a counter-shaft 10. This counter-shaft is connected to the upper section of the main spindle by means of intermeshing gears 11 and 12, which are keyed respectively to the upper section of the main spindle and to the counter-shaft. Also keyed to the counter-shaft 10 is a gear 14 which is in driving gear with a gear 15 loosely mounted on the lower section of the main spindle. As illustrated in the drawing this is the reversing gear train, and includes an intermediate gear 16 between the gears 14 and 15 in order to drive the lower spindle section 7 in the opposite direction to the upper spindle section 5, as will be readily understood. Keyed to the lower spindle section 7 between the gears 15 and 11 is a clutch 17 which may be of any suitable type adapted to move lengthwise of said spindle, and which is provided on opposite sides with locking faces adapted to engage, according to the position of the clutch, either with a locking projection 18 on the upper spindle section 5, or gear 11 thereon, or with a similar projection 19 on the gear 15. When the clutch is in neutral position as shown in Fig. 1 it is out of locking engagement with both of these elements.

Keyed to the lower spindle section 7 in different positions vertically are two gears 20 and 21, which mesh respectively with gears 22 and 23 loosely mounted on the counter-shaft 10. Keyed to the counter-shaft 10 so as to move lengthwise thereof between the gears 22 and 23 is a clutch 24 provided on its opposite sides with clutch faces adapted to lock, according to the position of the clutch, with either a clutch projection 25 on the gear 22, or a similar projection 26 on the gear 23, but which when in the position shown in the drawing is not in engagement with either of said gears. If desired, the clutch may be on the spindle 7 in which case the gears 20 and 21 will be loose on said spindle and the gears 22 and 23 will be keyed to the counter-shaft.

The clutches 17 and 24 may be of any suitable type. Each clutch is provided with an annular groove in which is a bronze or similar ring 27 which at diametrically opposite points is connected by means of trunnions 28 to the clutch levers. The lever 29 of the upper clutch is pivotally mounted at 30, while the lower clutch 31 is pivotally mounted at 32. Secured to the outer or forward end of each of these levers is a suitable handle, the connection being made by a universal or at least a double joint 33. The handle of the upper clutch lever projects downwardly at 34, and then outwardly at 35, while the handle of the lower clutch lever projects upwardly at 36 then outwardly at 37. The purpose of this is to bring the handles into proximity so as to provide for so interlocking them that only one of them can be moved at the same time out of neutral position, to thereby prevent a workman from accidentally throwing in both of the clutches simultaneously.

The particular interlocking arrangement comprises a suitable clutch plate 40 provided with an opening therein of irregular outline, but with the two side edges similar. This opening on each side is provided with a comparatively deep recess 41 for receiving a clutch handle when in neutral position. On each side above these neutral deep recesses is a projection 42 for locking the handles in their uppermost positions, and on each side below the neutral deep recesses is a projection 43 for locking said handles in their lowermost positions. The projections 42 and 43 are adapted to enter recesses 44 in the side faces of the clutch handles. The projections 42 and 43 and the recesses 44 are slightly beveled or undercut so that the handles will be held on those projections against accidental dislodgment. The neutral recesses 41 are of such depth that either one of said handles may be moved out into the main opening and then moved either up or down to bring it into locking engagement with either the projection 42 or the projection 43, and this movement is not interfered with by the other handle. When, however, one of said handles is locked either up or down, as shown in Fig. 3, it projects so far into the main opening or channel that it prevents the other handle from being withdrawn from its neutral recess. Consequently, when one of the clutches is in operative engagement with its coöperating part it is impossible for the workman to accidentally throw the other clutch into similar position. By this simple means breakage of the attachment is prevented.

The various sets of intermeshing gears are formed of gears of different diameters so as to drive at various speeds. For instance, the gears 21 and 23 give the highest speed, while the gears 22 and 20 give a lower speed, while when the clutch 17 is in locking engagement with the upper spindle section 5 the lower spindle section is driven direct and at exactly the same speed as the upper spindle section. By omitting the intermediate gear 16 and making the gears 14 and 15 of suitable size to inter-mesh, I may provide for still a fourth speed. The various gears which are shown as keyed to their shafts or spindles may obviously be formed integral therewith, or, instead of keying these gears to their spindles they may be secured thereto in any other suitable way.

In case the attachment is to be used for a considerable period of time without using the reversing feature it may be desirable to stop the gears 14, 15 and 16 from idle rotation. To this end the key 46 between the gear 14 and counter-shaft 10 is made movable, such as by providing it with a shank 47 which extends to the upper end of the shaft and by means of which the key can be drawn endwise to release the gear 14 from said counter-shaft.

When the attachment is to be used for tapping it is desirable to automatically stop the tap when the desired depth has been reached. For this purpose I provide an automatic trip as follows: Projecting from the stationary part 1 of the press is a bracket 48 through which extends the shank 49 of the trip. Above said bracket said shank is provided with an adjustable collar or stop 50 which may be secured thereto at any desired point depending upon the depth of the hole to be tapped, and which determines the point at which the trip becomes operative. The lower end of the shank is provided with a beveled projection 51 lying in the downward path of movement of the clutch handle 35, so that when the latter comes in contact with said beveled projection it is pushed off the projection 42 of the catch plate on which it is locked. A spring 52 pulls the clutch lever downwardly as soon as the handle is disconnected from the locking projection 42. This spring may be of any suitable type, and is shown as a helical tension spring having one end connected to the clutch handle 35 and its other end connected to a screw 53 threaded in the frame 3 and which serves as a means for adjusting the tension of said spring.

The spring 52 may merely throw the clutch 17 into neutral position or pull the same down until it locks with gear 15 so as to automatically reverse the tap. This depends upon the position of a certain stop 54 arranged to have two positions. If projected to the position shown in Fig. 2 it stops the handle 35 when the clutch is in neutral position, but if moved back to the full line position shown in Fig. 3 the handle 35 is free to go to the bottom of the opening in the catch plate and therefore bring the clutch 17 into position to reverse the tap.

The shank 49 is preferably formed in two sections which can be extended one with reference to the other without the necessity of changing the gage collar 50. As shown, the upper section telescopes slightly in the upper end of the lower section at 56, and is adapted to be locked thereto by means of a set screw 57 working in a slot 58 in the upper section of said rod. When the device is adapted for alternately drilling and tapping holes it is desirable that the drill go somewhat deeper than the tap. Consequently, when drilling the set screw 57 is loosened so as to allow the trip rod to become longer and permit the drill to go deeper into the hole. When the tap is being used, however, the trip rod is shortened as far as possible and then the set screw 57 tightened, in order to set the trip at the right position. This can be accomplished without disturbing the gage collar 50, by merely having the two members of the trip rod telescope as far within each other as possible so that when changing from the loose or drilling condition to the tapping condition, it is merely necessary to shove said sections together as far as possible and then tighten the set screw. This will take much less time than if the gage collar 50 is disturbed each time.

The frame 3 will be held against rotation by a suitable projection 60 contacting with a stationary part of the drill press. A chain may be used for this purpose if desired.

The attachment described permits of various modifications without departing from the spirit of the invention. If desired, the two lower sets of gears may be entirely omitted, when the attachment will become a simple reversing attachment. So too, the reversing feature can be omitted and another speed secured by omitting the intermediate gear 16 as heretofore described, and forming the gears 20 and 22 of such size that they will inter-mesh. While the automatic tripping feature is preferred this may if desired, be omitted. When retained, any form of spring for throwing down the clutch lever, and any means for regulating the tension of said spring may be employed. The particular form of stop illustrated for regulating the downward movement of the clutch handle when automatically tripped is not important, as other forms of stops will readily suggest themselves. So too, any forms of keys, or even other means may be used for connecting the clutches and the gears to the spindles. The drawings show a special form of quick-acting chuck but the attachment obviously can be used with any other form of chuck or for that matter the lower end of the lower spindle section 7 may be provided with a tapered hole to receive the shank of any suitable form of chuck. Instead of a train of intermeshing spur gears the reverse gear train may consist of two sprocket wheels and a sprocket chain, as will be obvious.

The operation of the attachment will be readily understood from the illustration and foregoing description. When both clutches are in the position shown in Fig. 1 all parts are idle. In order to drive direct the clutch 17 is raised to lock the lower spindle section 7 directly to the upper spindle section. To drive at a higher speed the clutch 17 is put to neutral position and the clutch 24 lifted into engagement with gear 22, and for a still higher speed clutch 24 is dropped into engagement with gear 23. When it is desired to reverse, clutch 24 being in neutral position, clutch 17 is dropped into engagement with gear 15. The attachment as illustrated therefore provides for three different speeds of forward drive and one speed of reverse drive.

What I claim is:

1. An attachment for drill presses comprising a frame, a two-part spindle mounted therein, a gear train and clutch intermediate the sections of said spindle and arranged when the clutch is in different positions to drive the lower spindle section in reverse directions, means for locking said clutch in direct drive position, means for automatically disengaging said locking means and moving the clutch, and a movable stop arranged when in one position to stop the clutch when it reaches neutral position, and when in another position to permit the clutch to go to reverse drive position.

2. An attachment for drill presses comprising a frame, a two-part spindle mounted therein, a gear train and clutch connecting the two sections of said spindle and arranged when the clutch is in different positions to drive the lower spindle section in reverse directions, means for locking said clutch in direct drive position, and tripping means for disengaging said clutch from locked position, said tripping means comprising a rod formed in two sections and extensible one with reference to the other, means for locking said two sections together, and a gage member engaging one of said sections and a stationary part of the press.

3. An attachment for drill presses comprising a frame, a two-part spindle mounted therein, two or more trains of gearing connecting the sections of said two-part spindle, a plurality of clutches, and means arranged to prevent more than one of said clutches being placed in operative engagement with a coöperating member at the same time.

4. An attachment for drill presses comprising a frame, a two-part spindle mounted therein, two or more trains of gearing intermediate the sections of said spindle, a plurality of clutches, a lever for each clutch, and a catch plate with which said levers are engaged and arranged to prevent movement from neutral position of more than one of said levers at the same time.

5. An attachment for drill presses comprising a frame, a two-part spindle mounted therein, a plurality of trains of gearing connecting the sections of said spindle, a plurality of clutches, a lever for operating each clutch, and a catch plate provided with an opening in which said levers move in moving the clutches from neutral to operative position, the plate being provided with recesses and projections so arranged that when one lever is in position to hold its clutch in an operative position the other lever is held in neutral position.

6. An attachment for drill presses comprising a frame, a two-part spindle mounted therein, a plurality of trains of gearing connecting the sections of said spindle, a plurality of clutches, an operating lever for each clutch, and a catch plate provided with an opening in which said levers move in moving the clutches into and out of operative position, the edges of the plate at said opening being provided with deep notches to receive the levers when the clutches are in neutral position, and with projections to lock the levers when moved to bring a clutch into operative position, said projections and recesses being so arranged that when one lever is in locking position it obstructs the movement of the other lever out of its neutral position.

7. An attachment for drill presses comprising a frame, a two-part spindle mounted therein, a plurality of trains of gearing connecting the sections of said spindle, a plurality of clutches, a lever for actuating each clutch, a catch plate provided with an opening in which said levers move when moving the clutches into and out of operative position, said plate on each side of said opening being provided with a deep central notch for receiving the levers in neutral position, and provided both above and below said deep notch with projecting portions serving as locking means for the levers and so arranged that when a lever is locked on either one of said projections it obstructs the movement of the other lever out of its neutral position recess.

8. In a drill press, the combination of a uniform speed main spindle, of a frame arranged for attachment to the drill press, a tap or drill bearing spindle rotatably mounted in stationary bearings in said frame and operatively connected with the main spindle by means of two or more speed changing trains of gearing, and clutch mechanism arranged to render either of said trains operative.

9. An attachment for drill presses comprising a frame, a two-part spindle mounted therein, a plurality of trains of gearing connecting the sections of said spindle, a plurality of clutches, a lever for operating each clutch, and a plate provided with an irregular channel in which said levers move in moving the clutches from neutral to operative position, the channel being so arranged that when one lever is in position to hold its clutch in operative position the other lever is held in neutral position.

In testimony whereof, I have hereunto set my hand.

FRANK P. MILLER.

Witnesses:
F. D. ECKER,
MARY GRAUEL.

Copies of this patent may be obtained for five cents each, by addressing the "Commissioner of Patents, Washington, D. C."